(12) United States Patent
Tengler et al.

(10) Patent No.: US 7,373,243 B2
(45) Date of Patent: May 13, 2008

(54) METHOD AND SYSTEM FOR PROVIDING TRAFFIC INFORMATION

(75) Inventors: Steve Tengler, Grosse Pointe Park, MI (US); Sue Bai, Wixom, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 387 days.

(21) Appl. No.: 10/813,445

(22) Filed: Mar. 31, 2004

(65) Prior Publication Data

US 2005/0222755 A1    Oct. 6, 2005

(51) Int. Cl.
*G01C 21/34* (2006.01)
*G06G 7/76* (2006.01)
*G06G 1/00* (2006.01)

(52) U.S. Cl. .................. 701/201; 701/24; 701/117; 342/357.1

(58) Field of Classification Search ........ 701/200–202, 701/208, 211, 213–214, 117, 24; 340/988; 342/357.06, 357.09, 357.1
See application file for complete search history.

(56) References Cited

U.S. PATENT DOCUMENTS

| | | | |
|---|---|---|---|
| 6,252,544 B1 | 6/2001 | Hoffberg | |
| 6,370,475 B1 | 4/2002 | Breed et al. | |
| 6,405,132 B1 | 6/2002 | Breed et al. | |
| 6,429,812 B1 | 8/2002 | Hoffberg | |
| 6,473,688 B2 | 10/2002 | Kohno et al. | |
| 6,526,349 B2 | 2/2003 | Bullock et al. | |
| 6,526,352 B1 | 2/2003 | Johnson et al. | |
| 6,973,378 B2 * | 12/2005 | Yamada | 701/48 |
| 6,990,407 B1 * | 1/2006 | Mbekeani et al. | 701/117 |
| 2002/0014976 A1 | 2/2002 | Yoshida | |
| 2002/0049527 A1 | 4/2002 | Kohno et al. | |
| 2002/0082048 A1 | 6/2002 | Toyoshima | |
| 2002/0198632 A1 | 12/2002 | Breed et al. | |
| 2003/0016005 A1 | 1/2003 | Leibowitz et al. | |
| 2003/0093187 A1 | 5/2003 | Walker | |
| 2003/0098800 A1 | 5/2003 | Jambhekar et al. | |

OTHER PUBLICATIONS

"Japanese System Predicts Traffic Jams", *autobeat Daily*, Mar. 26, 2004, pp. 1-3.

* cited by examiner

*Primary Examiner*—Yonel Beaulieu
(74) *Attorney, Agent, or Firm*—Foley & Lardner LLP

(57) ABSTRACT

A method, system, and software for automatically providing traffic information to a user, includes tracking and storing travel pattern data of the user, the travel pattern data including a time at which a travel occurs. The travel pattern data is analyzed to predict a particular travel path traveled by the user at a particular time when the travel occurs, and traffic information along the particular travel path is automatically determined at or before the particular time at which travel is predicted.

60 Claims, 2 Drawing Sheets

METHOD AND SYSTEM FOR PROVIDING TRAFFIC INFORMATION

BACKGROUND OF THE INVENTION

One of the problems facing many areas is the concentration of population around large metropolitan areas with a significant proportion of the population living in suburban areas. Therefore, a considerable amount of travel by road is required to get to work or to accomplish daily tasks. Furthermore, with the rapid growth of this population, the roads and the transportation infrastructure have invariably lagged behind the explosive growth of vehicles that travel on these roads.

With the roads being congested, a small disturbance in the traffic flow, such as that caused by an accident, can severely impact the travel time on these roads. Therefore, there is a significant need for a commuter to receive timely and pertinent traffic information about the roads on which they may be traveling.

Traffic information is often provided by radio or television broadcasts or by the internet. However, this information is generally not timely and is also generally not specific to a route that a user may want to travel on. For example, a Traffic Messaging Channel (TMC) is broadcast in some European countries and provides real time traffic information via lower frequency radio signals.

However, this and other known traffic/navigation systems generally require either (1) a centralized traffic information service provider, and/or (2) upfront set up by a user to configure a route (for example, on a website) often using specific tools provided by a traffic information service provider. Therefore, such systems are complex and not user friendly since specific tools have to be learned by the users in order to use the systems. Furthermore, the traffic information received by the user may not be timely enough for the user to make use of the information to adjust his route and minimize the travel time to get to his destination.

SUMMARY OF THE INVENTION

One embodiment of the invention described herein provides a method of automatically providing traffic information to a user, including: tracking and storing travel pattern data of the user, the travel pattern data including a time at which a travel occurs, analyzing the travel pattern data to predict a particular travel path traveled by the user at a particular time when the travel occurs, and automatically determining traffic information along the particular travel path at or before the particular time at which travel is predicted.

In one embodiment, the travel pattern data relates to travel by the user using a vehicle and the tracking and storing step includes receiving data from a position determining system.

Another embodiment provides a system for automatically providing traffic information to a user, the system including: a position determining system for tracking travel pattern data of the user, the travel pattern data including a time at which a travel occurs; a storage unit for storing the tracked travel pattern data; a processing unit that analyzes the travel pattern data to predict a particular travel path traveled by the user at a particular time when the travel occurs; and a short range communication unit that determines traffic information along the particular travel path at or before the particular time at which the travel is predicted.

A further embodiment provides a computer readable medium having program code recorded thereon that, when executed, causes a processor to perform steps including: tracking and storing travel pattern data of a user, the travel pattern data including a time at which a travel occurs, analyzing the travel pattern data to predict a particular travel path traveled by the user at a particular time when the travel occurs; and automatically determining traffic information along the particular travel path at or before the particular time at which travel is predicted.

BRIEF DESCRIPTION OF THE DRAWINGS

The accompanying drawings, which are incorporated in and constitute a part of the specification, illustrate embodiment(s) of the invention, and, together with the general description given above and the detailed description of the embodiment(s) given below, serve to explain the principles of the invention.

DETAILED DESCRIPTION OF THE EMBODIMENTS

Figure 1:
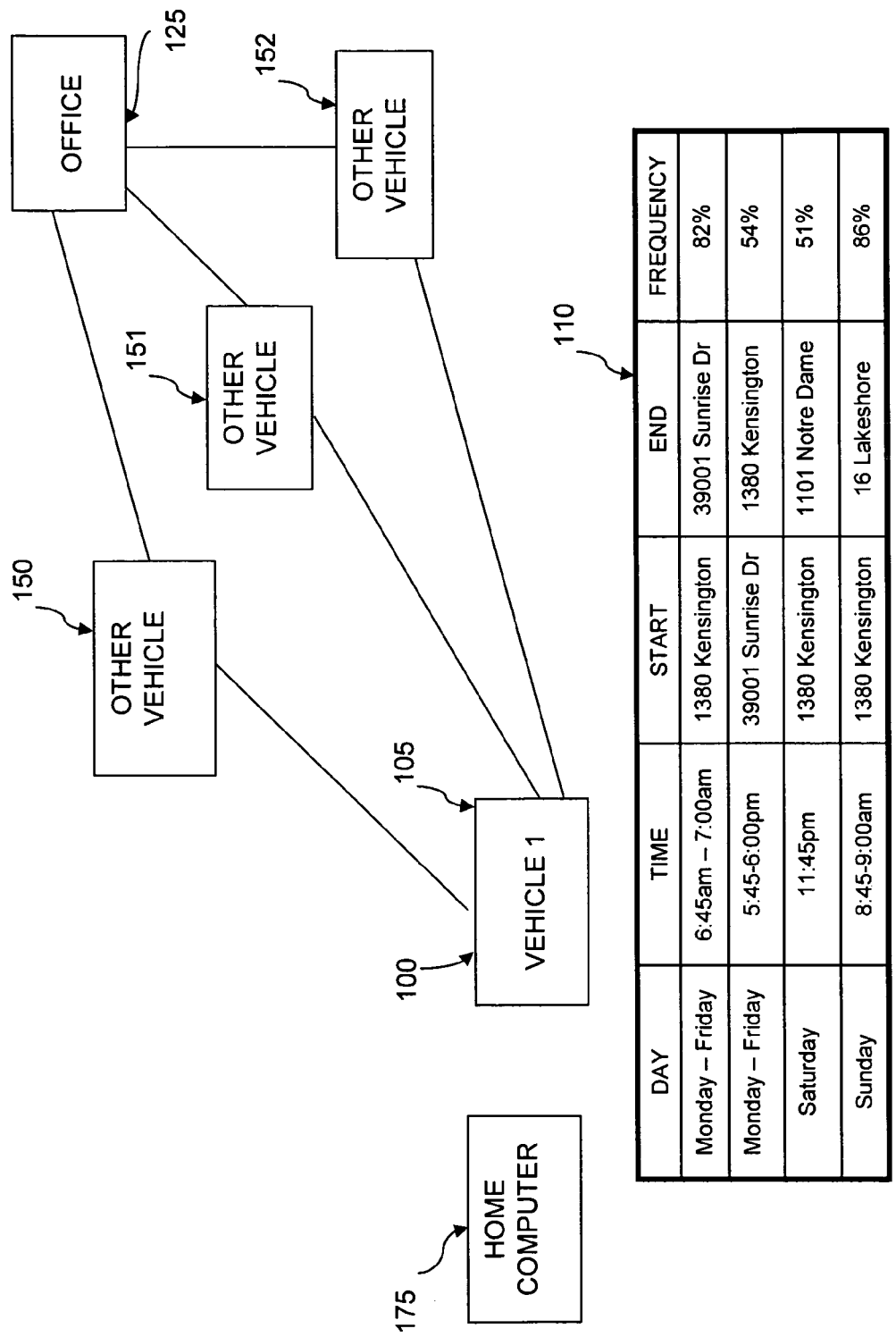
FIG. 1 discloses the components of one embodiment of the traffic information system according to the present invention.

Certain embodiments of the present invention are described below with reference to drawings. These drawings illustrate certain details of specific embodiments of the systems, methods, and programs of these embodiments. However, describing embodiments of the invention with drawings should not be construed as imposing on the invention any limitations that may be present in the drawings.

Certain embodiments of the present invention are directed to providing dynamic, real time traffic information to a user (for example, a vehicle driver) by anticipating the travel-path that a user will travel based on tracking and analyzing the past travel patterns of the same user. Furthermore, the traffic information is timely and automatically generated before the user commences his travel so that timely and relevant information is available to the user at a time when the user can make the best use of that information. In certain embodiments, the user may also be presented with best alternate travel paths to particular destinations when the user's anticipated travel path to that destination is congested. In certain embodiments of the present invention, the traffic information is determined automatically by communicating with other vehicles on the anticipated travel path using short range communication technologies such as the Dedicated Shortwave Radio Communications (DSRC). To accomplish this communication, each of the vehicles in the traffic information system are equipped with a short range communications unit to communicate with other vehicles using an effective short range communications technology, such as DSRC.

As is known to those skilled in the art, DSRC is a communications approach between vehicles and the roadside for a variety of purposes, such as intersection collision avoidance, transit or emergency vehicle priority signals, electronic parking payments, and commercial vehicle clearance and safety inspections. While many current DSRC applications operate in the 902-928 MHz band, a 75 MHz band in the 5.9 GHz range has also been allocated for DSRC communications for intelligent transportation systems (ITS). Therefore, this band could be advantageously used to provide the inter-vehicle communication to exchange traffic information as contemplated by embodiments of the present invention.

Therefore, inter vehicle communication can be easily accomplished using DSRC to provide information including GPS location, vehicle speed, and a vehicle's road segment from one vehicle to another. This information can be communicated from an on-board unit (OBU) of one vehicle to an OBU of another vehicle that is in range for radio frequency communication. Therefore, the OBU is one example of a short range communications unit that may use the DSRC technology to communicate with other vehicles that are in range for effective DSRC communication. This information can enable a first vehicle to determine all the other vehicles in its vicinity (for example, within a distance of 1000 meters) and then establish communication with those vehicles that are in an anticipated travel path of the first vehicle.

It is expected that DSRC systems created by different manufacturers will be interoperable based on a standard, such as one that may be created by the Federal Communications Commission (FCC) in 2004 so that OBU's manufactured by different manufacturers will be able to communicate with each other. Furthermore, once the vehicle is able to determine which other vehicles are in its vicinity, it may also establish a DSRC communication link using a handshake protocol and then use the communication link to transfer data between two vehicles each having its own DSRC system. For example, information that may be useful for determining traffic information, for example, recent crashes or the average travel speed can be communicated from one vehicle to another using DSRC communications. Furthermore, it should be recognized that the on-board unit (OBU) is a processing unit and includes the necessary software (and/or firmware and/or logic circuits) for implementing the processing logic discussed herein. Accordingly, one skilled in the art would recognize that such software may be located in a memory associated with a processor in the OBU while additional programs and data may even be stored in a database or storage unit or may be accessible by the OBU by using a suitable communications network.

Referring to the figures, FIG. 1 discloses the components of one embodiment of the traffic information system according to the present invention. It is intended that FIG. 1 is exemplary only and one skilled in the art would recognize various alternatives, modifications, or equivalents all of which are considered to be a part of the present invention.

A vehicle 100 includes an OBU 105 such as that discussed above. The OBU 105 communicates with a storage unit such as a database 110 (or other memory that stores information as would be recognized by those skilled in the art) that records the travel pattern data of a user of the vehicle 100. Some of the travel pattern data that may be stored in the database 110 include the day of week and/or month, the start time (or time range), a start location, an end location, and one or more data fields that are calculated or derived by periodic analysis. For example, a frequency data field could be periodically updated to determine the frequency of a user using a particular travel path at a particular time. The periodic updates may be done each time the ignition is switched off or on a daily, weekly, or some other recurring period. Alternatively, the periodic update may be initiated by the user or may be initiated by the OBU 105 once a certain amount of additional travel pattern data has been collected by the system. For example, if a vehicle 100 has not been used for a month, there may not be a need to update the travel pattern data as frequently as when a significant amount of travel pattern data has been collected over a short period of time.

The travel pattern data, such as the day, time, as well as the start and end location data may be collected using a position determining system unit that is provided in the vehicle and communicates with the traffic information system provided in accordance with the present invention. The position determining system unit in the car may be a GPS receiver in the car that communicates with a GPS satellite system to determine its position using techniques (such as three dimensional trilateration) that are well known to those skilled in the art and included in the commercially available GPS systems that are available in the market. Likewise, information from the position determining system could also be used to track the travel segments along the travel path of the user and these travel segments could also be stored in association with the start and end locations and times to accurately keep track of the actual or preferred travel path of the user between particular locations at particular times.

One skilled in the art would recognize that the travel pattern data stored that is listed above is exemplary only and additional similar data may also be stored.

For example, the travel pattern data may be collected over a certain time period, for example, one month or one year or for an even longer period. In one embodiment, the travel pattern data collected more recently may be given more weight than older information on a rolling basis. For example, the data collected over the last month may be given more weight than the data collected in a previous month and so on.

In one embodiment, the travel pattern data is collected for a vehicle assuming that there is only one user or the traffic information system does not distinguish between two different users that may be driving the same vehicle. However, in an alternate embodiment, the traffic information system may store the travel pattern data correlated with the users of the vehicle. This can be accomplished, for example, if the vehicle is able to distinguish between the different users using the vehicle. This may be done, for example, if the vehicle allows different users to use a different code in a keyless entry system or even if the vehicle allows different users to program different settings in the vehicle (for example, these settings could include the seat and mirror positions). If such information is available that can be used to distinguish between the different users using a particular vehicle, then the travel pattern data can also be stored indexed by the users.

Other vehicles 150, 151, and 152 represent vehicles that are within short range or radio communication range of the vehicle 100 and are also equipped with the traffic information system to communicate with the vehicle 100. Each of these vehicles is equipped with radio communication equipment (such as DSRC equipment) and a position determining system unit (such as a GPS system unit) and is able to determine its position and time information and communicate the same with other vehicles (or possibly even with roadside communication equipment). Furthermore, each of these vehicles 150, 151, and 152 is also equipped with appropriate sensors to detect a crash and to transmit information regarding a detected crash to other vehicles (and/or roadside equipment) as discussed in detail further herein.

User accessible devices 175 refers generally to user accessible devices that a user may access to, among others, receive information from the traffic information system provided according to certain embodiments of the present invention Therefore, the user accessible devices 175 may include a home computer, a mobile phone, a PDA and/or other handheld devices that has a display or other output mechanism (for example, a speech synthesizer) by which information from the traffic information system may be timely provided to the user. The traffic information may be provided to the user as requested by the user or may be provided to the user as alerts or as a combination of the two. For example, routine traffic information may be provided to the user accessible devices 175 when requested by the user while important disruptions, such as crashes, may be provided to the user accessible devices 175 as alerts especially if these important disruptions occur proximate to an anticipated travel of the user along an anticipated travel path as determined based on the travel pattern data stored and analyzed by the traffic information system. For example, if a crash is detected at 6:45 AM on Monday-Friday on a travel path to the office 125, based on the information in the database 110, the traffic information system may provide an alert to the home computer of the user so that the user is alerted of the major disruption before he commences his anticipated travel to the office 125.

Figure 2:
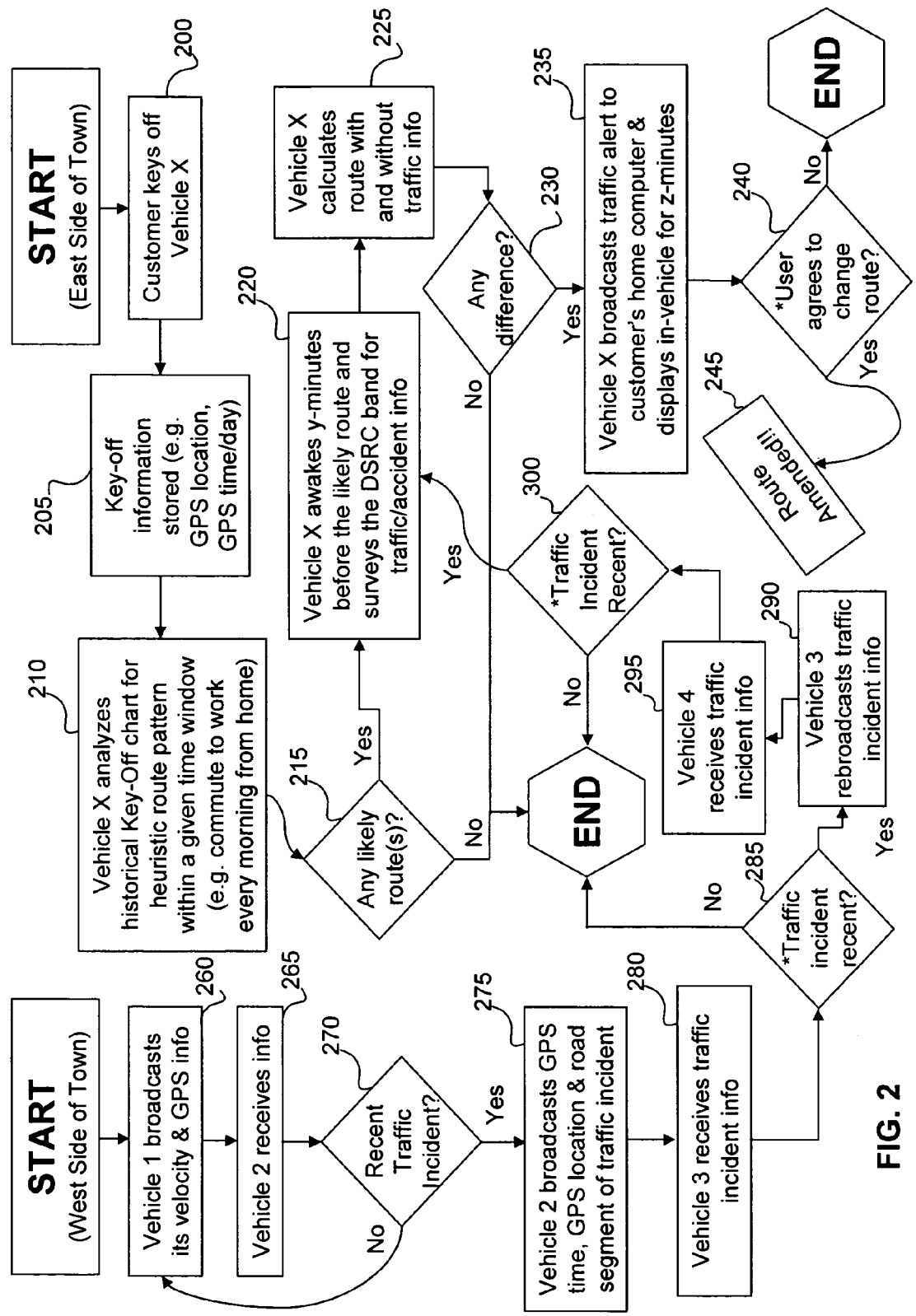
FIG. 2 discloses the processing logic to implement the traffic information system according to one embodiment of the present invention.

One embodiment of the processing logic to implement the traffic information system is disclosed in FIG. 2. In step 200, a user of a vehicle switches off the vehicle at a particular location. In step 205, position and time information at the time of switching off is recorded in the travel pattern data storage database 110 in the vehicle. It should be understood that while the database 110 is located in the vehicle in certain embodiments, the database 110 may also be located at a remote or central location with the vehicle transmitting the required information to the remote or central database using wireless or wire-line communication systems as will be recognized by those skilled in the art. Some of the information or travel pattern data that may be stored in the database 110 includes the position and time data for the vehicle at the time the vehicle is switched off as determined by a position determining system associated with the vehicle (such as the satellite based GPS system).

In step 210, the vehicle analyzes the travel pattern data stored in the database 110 to determine route patterns in a given time window using one or more heuristic algorithms. For example, one such heuristic algorithm may examine each 15 minute time interval (or some similar time interval) to determine if travel along a particular travel path is frequently initiated during a particular time interval on certain days of the week. For example, the algorithm may determine whether a particular travel path is traveled at a certain time interval (for example, based on the travel start time) with a frequency greater than X % (where X may be a relatively high frequency such as 80%). Alternatively, the algorithm might also analyze to see whether there are any correlations between particular start locations and particular end locations even if the time interval of the travel between the particular start locations and particular end locations is varied. This could occur, for example, if the user of the vehicle regularly went to a particular grocery store or child care location and then returned home even if the time interval associated with that travel path varied.

Therefore, based on the heuristic algorithms executed in the step 210, the traffic information system determines or predicts whether there are any likely routes for the vehicle (hereafter "vehicle X") or vehicle/user combination based on the current location (i.e., the last switch off location) as a start location and optionally a time window having a high frequency of travel from that start location. Alternatively, the algorithm may also determine or predict a likely route based on a time window (date/time) and a likely destination. For example, if a vehicle X regularly travels to the office 125 at a particular travel window, a travel path from a current location to the office 125 may also be investigated as a possible likely route at the appropriate time window.

In step 215, if one or more likely routes are determined based on the analysis of the travel pattern data in step 210, the vehicle's traffic information system proceeds to step 220 to automatically collect timely traffic information along the likely routes at the appropriate time. For example, if a likely route and a time window associated with the likely route have been determined in steps 210 and 215, traffic information is generated at the beginning of the time window or just before the time window. If no time window has been determined but a likely route has been determined, then the traffic information may be generated when the ignition is next switched on. Alternatively, the traffic information system may estimate a likely time window for the likely route using heuristic algorithms, for example, estimating that the travel is likely to be in the morning or in the evening. Thereafter, the traffic information may be generated at or before the estimated time window.

The traffic information is generated as shown in the steps 260-300. These steps are executed by cooperation among vehicles that are traveling at any given time and are equipped with components of the traffic information system as provided by certain embodiments of the present invention. A vehicle 1 broadcasts its velocity and location (GPS) information to all vehicles within its transmission range in step 260. As discussed earlier herein, the transmission range in certain embodiments is within a short range radio transmission range such that effective for DSRC communication.

Vehicle 2 receives this information in step 265 and determines whether a traffic incident has occurred such as whether two vehicles are crashing (or have recently crashed in the recent past) in step 270 based on the information received from vehicle 1 and the velocity and position information of vehicle 2 itself that is available to vehicle 2 using a position determining system such as a GPS system. Of course, one skilled in the art would recognize that vehicle 2 is not just one vehicle but could be anyone of all the vehicles that are in short range communication range of vehicle 1.

In step 275, if vehicle 2 determines that a traffic incident has occurred, then it broadcasts the time, location, and the road segment of the crash. All vehicles within range of the broadcast from vehicle 2 receive the broadcast information of the crash. More generally, the broadcast information need not only be crash information but could include information relating to other traffic incidents that can be discerned by vehicle 2. For example, if vehicle 2 travels below a certain speed for a certain time duration, a "slow down" traffic incident signal may be broadcast. Each of these vehicles (for example, a vehicle 3) receives the crash information in step 280 which includes the location, time, and road segment of the traffic incident. In step 285, vehicle 3 determines whether the traffic incident was recent where "recent" is defined based on an elapsed time ceiling and/or based on a combination of elapsed time with the severity of the traffic incident. For example, a sensed four car crash (as one example of a traffic incident) may be broadcast for a longer time while a two car crash may be broadcast for a shorter time. Alternatively, the type of road segment may also be a factor in determining the length of time for which the traffic incident information is to be broadcast. For example, traffic incident information for a crash on highways may be broadcast for a longer time than a crash on a local road since the impact of the highway crash is likely to be greater.

As shown in steps 290, 295, and 300, the steps of automatically receiving traffic incident information, determining whether to rebroadcast the traffic incident information, and then rebroadcasting the crash information if it is deemed to be "recent," is carried forward through a chain of vehicles that are equipped with the traffic information system.

Therefore, in step 220, the vehicle X receives traffic incident information from all vehicles who are within broadcast range of vehicle X. Therefore, vehicle X is able to automatically get recent traffic incident information from all the vehicles that have traveled along one or more of its likely routes of interest since communication between the vehicles are chained together. That is, recent traffic incident information from a vehicle 1 reaches vehicle X through broadcasts or rebroadcasts by vehicles 2 and 3 and so on. In this manner, vehicle X is able to automatically determine recent traffic congestion information (based on whether there is a traffic incident) for its likely route in step 220. Accordingly, in step 220, vehicle X is able to estimate its travel time along the likely route with crash information factored into its estimation.

Thereafter, in step 225, vehicle X calculates the route without the traffic information and then determines whether there is any significant difference between the two calculations in step 230. If a significant difference is detected in step 230, the traffic information system communicates the traffic information to the user through the user accessible devices 175, as discussed earlier herein. Furthermore, as discussed earlier herein, the traffic information system can decide to provide some traffic congestion information as an alert to the user whereas more routine traffic information may be provided as a display when requested by the user or whenever the user switches on the ignition.

In step 240, if the user agrees to change his route, the traffic information may suggest alternate routes to the likely destination (or a destination indicated by the user) and further gather recent traffic information about these alternate routes (if such information has not already been collected) so that the user may choose the optimal alternate route based on the recent traffic congestion information provided by the traffic information system. Once the user selects an amended route in step 245, the traffic information system may continue to monitor for traffic congestion information to inform the user of any traffic congestion along the selected route so that the user may be able to adjust his selected route even after he has embarked on the selected route in step 245.

Furthermore, various embodiments of the present invention contemplate methods, systems, and program products on any computer readable media for accomplishing its operations. Some embodiments of the present invention may be implemented using an existing computer processor, or by a special purpose computer processor configured for this or another purpose.

As noted above, embodiments within the scope of the present invention include program products on computer-readable media and carriers for carrying, or having computer-executable instructions or data structures stored thereon. Such computer-readable media can be any available media which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer or processor, the computer or processor properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processor to perform a certain function or group of functions.

Some embodiments of the invention have been described in the general context of method steps which may be implemented, for example, by a program product including computer-executable instructions, such as program modules, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A method of automatically providing traffic information to a user's vehicle, comprising:
    tracking and storing travel pattern data of the user, the travel pattern data including a time at which a travel occurs,
    analyzing the travel pattern data to predict a particular travel path traveled by the user at a particular time when the travel occurs; and
    automatically determining traffic information along the particular travel path at or before the particular time at which travel is predicted by communicating with a second vehicle to receive the traffic information, wherein at least part of the traffic information originates from a source other than the second vehicle.

2. The method according to claim 1, wherein the tracking and storing step comprises tracking and storing a start time, a day of the week, a start location, and an end location for each travel of the user.

3. The method according to claim 1, wherein the travel pattern data relates to travel by the user using a vehicle.

4. The method according to claim 1, wherein the tracking and storing step comprises receiving data from a position determining system.

5. The method according to claim 4, wherein the position determining system is a satellite based GPS system.

6. The method according to claim 2, wherein the start time is determined at a time of switching on an ignition, and an end time is determined at a time of switching off the ignition.

7. The method according to claim 6, wherein the switching on the ignition and the switching off the ignition is determined based on a key-on or key-off position of an ignition key.

8. The method according to claim 2, wherein the analyzing step comprises correlating pairs of start locations and end locations with a range of start times and/or a day of the week.

9. The method according to claim 8, wherein the analyzing step further comprises calculating a frequency of the correlated pairs of start locations and end locations with a range of start times and/or a day of the week.

10. The method according to claim 1, wherein the step of determining traffic information comprises communicating with the second vehicle along the particular travel path to receive traffic incident information from the second vehicle.

11. The method according to claim 1, wherein the step of determining traffic information comprises communicating with the second vehicle along the travel path to receive travel speed information from the second vehicle.

12. The method according to claim 10, wherein the user's vehicle communicates with the second vehicle along the travel path to receive traffic incident information from the second vehicle.

13. The method according to claim 1, wherein the second vehicle transmits traffic information only if the traffic information satisfies a predetermined criteria.

14. The method according to claim 13, wherein the traffic information includes traffic incident information and the predetermined criteria includes whether or not the traffic incident information is recent.

15. The method according to claim 14, wherein the traffic incident information is determined to be recent based in part on the type of road on which the traffic incident is detected or on the number of vehicles involved in the traffic incident.

16. The method according to claim 11, wherein communicating with the vehicle is accomplished using short range communication.

17. The method according to claim 16, wherein the short range communication is Dedicated Shortwave Radio Communications (DSRC).

18. The method according to claim 1, wherein the automatically determined traffic information is displayed to the user on a display within a vehicle at or before the particular time or whenever an ignition switch is switched on.

19. The method according to claim 1, wherein the automatically determined traffic information is displayed to a user at a user accessible display at or before the particular time.

20. The method according to claim 19, wherein the user accessible display comprises one or more of a home computer, a mobile phone, a PDA, or a handheld device.

21. A system for automatically providing traffic information to a user's vehicle, comprising:
    a position determining system configured to track travel pattern data of the user, the travel pattern data including a time at which a travel occurs;
    a storage unit configured to store the tracked travel pattern data;
    a processing unit configured to analyze the travel pattern data to predict a particular travel path traveled by the user at a particular time when the travel occurs; and
    a short range communication unit configured to automatically determine traffic information along the particular travel path at or before the particular time at which the travel is predicted, wherein the short range communication unit is configured to automatically determine the traffic information by communicating with a second vehicle to receive the traffic information, wherein at least part of the traffic information originates from a source other than the second vehicle.

22. The system according to claim 21, wherein the tracked travel pattern data comprises a start time, a day of the week, a start location, and an end location for travel of the user.

23. The system according to claim 22, wherein the tracked travel pattern data relates to travel by the user using a vehicle.

24. The system according to claim 21, wherein the position determining system comprises a GPS receiver that communicates with a satellite based GPS system.

25. The system according to claim 22, wherein the start time is determined at a time of switching on an ignition, and an end time is determined at a time of switching off the ignition.

26. The system according to claim 22, wherein the processing unit analyzes the travel pattern data by correlating pairs of start locations and end locations with a range of start times and/or a day of the week.

27. The system according to claim 26, wherein the processing unit further calculates a frequency of the correlated pairs of start locations and end locations with a range of start times and/or a day of the week.

28. The system according to claim 21, wherein the short range communication unit determines traffic information by communicating with the second vehicle along the particular travel path to receive traffic incident information from the second vehicle.

29. The system according to claim 21, wherein the short range communication unit determines traffic information by communicating with the second vehicle along the particular travel path to receive speed information from the second vehicle.

30. The system according to claim 28, wherein the user's vehicle communicates with the second vehicle along the travel path to receive traffic incident information from the second vehicle.

31. The system according to claim 21, wherein the second vehicle only transmits traffic information that satisfies a predetermined criteria.

32. The system according to claim 31, wherein the traffic information includes traffic incident information and the predetermined criteria includes whether or not the traffic incident information is recent.

33. The system according to claim 32, wherein the traffic incident information is determined to be recent based in part on the type of the road on which a traffic incident is detected or the number of vehicles involved in the traffic incident.

34. The system according to claim 21, wherein the short range communication unit comprises a Dedicated Shortwave Radio Communications (DSRC) unit.

35. The system according to claim 21, further comprising a display unit in the user's vehicle for displaying the automatically determined traffic information at or before the particular time or when an ignition switch is switched on proximate to the particular time.

36. The system according to claim 21, further comprising a display unit for displaying the automatically determined traffic information at or before the particular time at a user accessible device.

37. The system according to claim 36, wherein the user accessible device comprises one or more of a home computer, a mobile phone, a PDA, or other handheld device.

38. A system for automatically providing traffic information to a user's vehicle, comprising:
position determining means for tracking travel pattern data of the user, the travel pattern data including a time at which a travel occurs;
storage means for storing the tracked travel pattern data;
means for analyzing the travel pattern data to predict a particular travel path traveled by the user at a particular time when the travel occurs; and
communication means that automatically determines traffic information along the particular travel path at or before the particular time at which the travel is predicted, wherein the communication means is configured to automatically determine the traffic information by communicating with a second vehicle to receive the traffic information, wherein at least part of the traffic information originates from a source other than the second vehicle.

39. A computer readable medium having program code recorded thereon that, when executed, causes a processor to perform steps comprising:
tracking and storing travel pattern data of a user, the travel pattern data including a time at which a travel occurs;
analyzing the travel pattern data to predict a particular travel path traveled by the user at a particular time when the travel occurs; and
automatically determining traffic information along the particular travel path at or before the particular time at which travel is predicted by communicating with a second vehicle to receive the traffic information, wherein at least part of the traffic information originates from a source other than the second vehicle.

40. The method according to claim 1,
wherein the tracking and storing step comprises tracking and storing a start time, a day of the week, a start location, and an end location for each travel of the user;
wherein the start time is determined at a time of switching on an ignition, and an end time is determined at a time of switching off the ignition.

41. The system according to claim 21,
wherein the short range communication unit is configured to communicate with short range communication, wherein the short range communication is Dedicated Shortwave Radio Communications (DSRC).

42. The system of claim 41, wherein the system is configured to activate at a predetermined time before the particular time when the travel occurs, wherein the short range communication unit is configured to determine the traffic information along the particular travel path when the system activates.

43. The system of claim 41, wherein the system is configured to analyze and compare the travel path with traffic information and without traffic information.

44. A system for automatically providing traffic information to a user, comprising:
a position determining system configured to track vehicle travel pattern data of the user, the travel pattern data including a time at which a travel occurs;
a storage unit configured to store the tracked travel pattern data;
a processing unit configured to analyze the travel pattern data to predict a particular vehicle travel path traveled by the user at a particular time when the travel occurs; and
a short range communication unit in a vehicle configured to automatically determine traffic information along the particular vehicle travel path at or before the particular time at which the travel is predicted;
wherein the short range communication unit is configured to communicate with a second vehicle along the travel path to receive traffic information from the second vehicle, wherein the traffic information from the second vehicle comprises rebroadcasted travel information that originated from a vehicle other than the second vehicle.

45. A method of automatically providing traffic information to a user of a vehicle, comprising:
tracking and storing travel pattern data of a user, the travel pattern data including a time at which a travel occurs;
analyzing the travel pattern data to predict a particular travel path traveled by the user at a particular time when the travel occurs, and automatically determining traffic information along the particular travel path at or before the particular time at which travel is predicted by communicating with a second vehicle to receive the traffic information, wherein at least part of the traffic information from the second vehicle comprises rebroadcasted traffic information that originated from a source other than the second vehicle.

46. The method according to claim 1, wherein the travel pattern data is analyzed to determine whether the travel path is traveled at a frequency greater than a threshold value.

47. The system according to claim 21, wherein the processing unit is configured to analyze the travel pattern data to determine whether the travel path is traveled at a frequency greater than a threshold value.

48. The method according to claim 1, wherein the vehicle communicates directly with the second vehicle.

49. The system according to claim 21, wherein the short range communication unit is configured to communicate directly with the second vehicle.

50. The system according to claim 38, wherein the means for analyzing is configured to analyze the travel pattern data to determine whether the travel path is traveled at a frequency greater than a threshold value.

51. The computer readable medium of claim 39, wherein the analyzing step comprises analyzing the travel pattern data to determine whether the travel path is traveled at a frequency greater than a threshold value.

52. The system according to claim 21, wherein the system is configured so that all components of the system are configured to be disposed in the user's vehicle.

53. The system according to claim 38, wherein the system is configured so that all components of the system are configured to be disposed in the user's vehicle.

54. A network of systems for automatically providing traffic information to users of multiple vehicles, comprising:
 a first vehicle with the system of claim 21, and
 at least a second vehicle with the system of claim 21,
 wherein the system of the first vehicle and the system of the second are configured to communicate traffic information with at least one another.

55. A network of systems for automatically providing traffic information to users of multiple vehicles, comprising:
 a first vehicle with the system of claim 38, and
 at least a second vehicle with the system of claim 38,
 wherein the system of the first vehicle and the system of the second are configured to communicate traffic information with at least one another.

56. The method according to claim 1, wherein the source is another vehicle.

57. The system according to claim 21, wherein the source is another vehicle.

58. The system according to claim 38, wherein the source is another vehicle.

59. The computer readable medium of claim 39, wherein the source is another vehicle.

60. The method according to claim 45, wherein the source is another vehicle.

* * * * *